Sept. 15, 1953  E. K. BONNER, JR., ET AL  2,651,906
MOWING MACHINE HAVING VIBRATION NEUTRALIZING MEANS
Filed Feb. 17, 1950
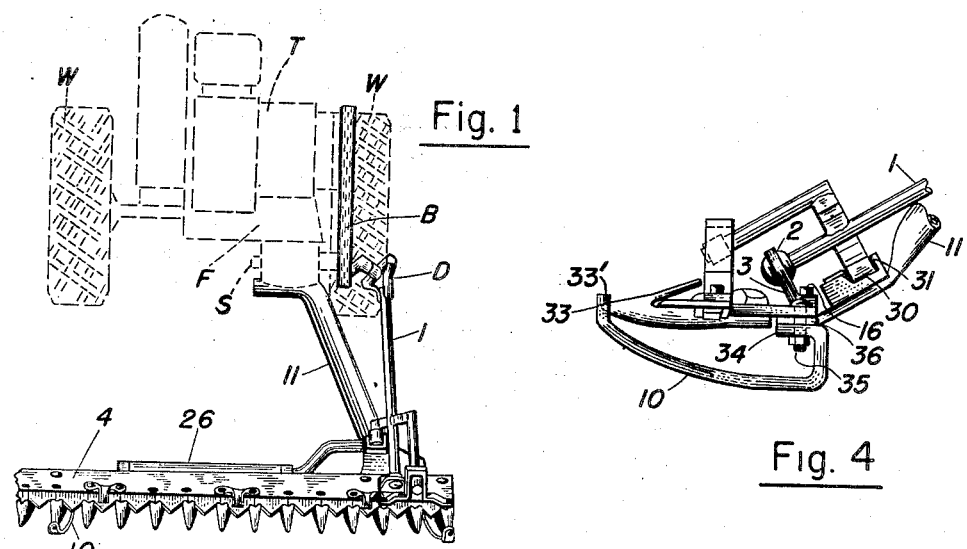
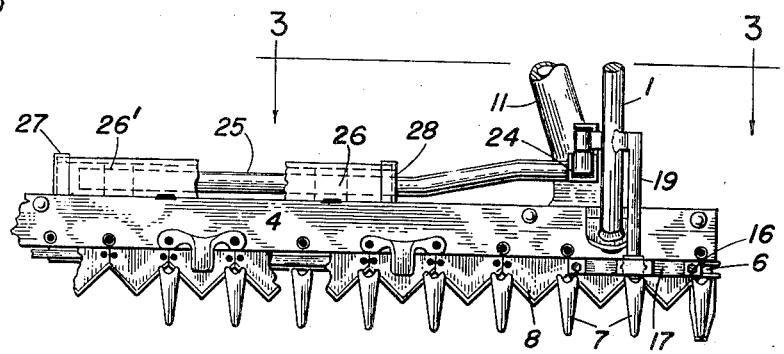
Inventors
Edwin K. Bonner Jr.
Joseph John Vozzi
By
Attorney Patented Sept. 15, 1953

2,651,906

UNITED STATES PATENT OFFICE 2,651,906

MOWING MACHINE HAVING VIBRATION NEUTRALIZING MEANS

Edwin K. Bonner, Jr., Torresdale, and Joseph John Vozzi, Philadelphia, Pa., assignors to S. L. Allen & Co., Inc., Philadelphia, Pa., a corporation of Pennsylvania Application February 17, 1950, Serial No. 144,756

2 Claims. (Cl. 56—257)

This invention relates to mowing machines, and mower attachments for tractors, and is particularly directed to means for counteracting and so substantially neutralizing the vibration induced by reciprocation of the sickle blade of the mower, mechanism embodying the invention being adapted for use with reciprocating single sickle mowers generally, whatever specific type of driving and actuating device be employed therefor.

It is thus a principal object of the invention to provide an improved mower or mower attachment of the single sickle type in which the driving mechanism for reciprocating the sickle blade has associated with it means for minimizing the vibration in the apparatus as a whole while in operation.

A further object is to provide a mower or mower attachment particularly suitable for a garden tractor or the like which operates smoothly and substantially vibrationlessly from the tractor power takeoff and so designed that the mower sickle is positioned forwardly of the tractor drive wheels in a novel manner and thus adapted to mow a swath of grass, grain or the like as the tractor moves over the ground.

Other objects, purposes and advantages of the invention will hereafter more fully appear or will be understood from the following description of a preferred embodiment of it illustrated in the accompanying drawing, in which:

Fig. 1 is a fragmentary front view of a mower attachment embodying the invention in operative association with a garden tractor of known type, of which a typical one is indicated in the said figure in broken lines.

Fig. 2, on a larger scale, is a fragmentary top plan view of the sickle bar and associated mechanism of the said attachment.

Fig. 3 is a fragmentary rear view thereof looking in the direction of arrows 3—3 in Fig. 2, and Fig. 4 is a side elevation looking from the left in the direction of arrows 4—4 in Fig. 3.

Referring now more particularly to the drawing the tractor T indicated therein in broken lines will be understood as merely typical of tractors in general use in association with which the mower attachment of our invention may be employed, the said tractor comprising a frame F, a pair of ground engaging drive wheels W, a power take off belt B driving a shaft S provided with a wobble drive mechanism D of more or less conventional form which constitutes no part of the invention. This wobble drive mechanism, which may be similar to that disclosed in U. S. Letters Patent 2,297,317 granted September 29, 1942 to Louis A. Paradise et al., is adapted to convert rotary motion of the shaft S to oscillatory motion of a mower drive shaft 1 which extends forwardly and downwardly from said mechanism. Shaft 1, supported at its lower end in a, desirably self-lubricating, bearing 2 carried by a bracket 3 on the main plate 4 of the mower therefore turns through a partial revolution in opposite directions when the shaft S is in motion and through mechanism to be hereafter more particularly described thereby reciprocates the sickle bar 6 of mower relatively to laterally spaced fingers which are mounted at spaced intervals along the main plate 4 to form the guard 7 cooperative with the sickle blades 8 carried by the sickle bar 6 to constitute the cutting elements of the mower; these parts may be of any usual or desired specific character. Mowers of this general type arew ell known and adapted to be moved along the ground at the proper height on shoes 10 bolted to the mower plate, forward motion of the mower being transmitted from the tractor through a tubular supporting arm 11 secured at its rear end to the tractor frame and at its front end to the plate 4; desirably the ends of the arm 11 are flattened as indicated in the drawing to facilitate its connection to these parts.

For reciprocating the sickle relatively to the plate 4 and guard 7 there is attached to the sickle bar 6 as by cap screws 16 a generally U-shaped yoke 17 which receives a roller 18 carried by a post 19 parallel to the shaft 1, radially offset therefrom, and preferably having a welded connection or arm 20 with the shaft, whereby as the shaft oscillates about its axis through a limited arc the post 19 carrying the roller 18 describes a corresponding arc and thus induces a reciprocating motion of the sickle bar 6 and blades 8 through its engagement with the inner surfaces of the legs of the yoke 17.

As thus far described the drive of the sickle bar 6 is of more or less conventional character and in mowers in which the parts to which specific reference has been made constitute the complete sickle drive excessive vibration of the mower as a whole is produced and transmitted through the mower supporting structure to the main tractor frame, resulting in erratic operation and rapid deterioration of the entire mechanism in service.

However in accordance with our invention means are provided which substantially eliminate such vibration whereby when the mower is in operation the reciprocation of the sickle bar is effected smoothly and substantially vibrationlessly and without the loss of the power dissipated in such vibration when it is present. More particularly the said means comprise an auxiliary post 21 disposed parallel to the shaft 1 diametrically opposite the post 19 with respect to and at the same distance from the shaft axis and rigidly secured to the shaft as by a welded connection or arm 22. The free extremity of this post carries a roller 23 engageable with the opposed inner side faces of a box-like member 24 preferably integral with a reciprocal counterpoise or bar 25 the main body of which is desirably substantially cylindrical and disposed parallel to the plate 4 adjacent its rear edge, being slidable axially in a tubular guide sleeve 26. This sleeve, which preferably is provided with bushings 26' forming a good sliding fit on the counterpoise, is welded or otherwise rigidly secured to the plate 4 and may be provided at its ends with rings 27, 28 within each of which may be seated a felt washer or other packing (not shown) for excluding dust and other foreign matter from the sleeve while permitting free reciprocation therein of the counterpoise 25.

The box 24 is relieved at 30 adjacent the post 21 to permit the latter to move freely with the shaft 1, the engagement of the roller 23 with the box walls thereby reciprocating the counterpoise 25 in correspondence with reciprocation of the sickle bar but 180° out of phase with respect thereto, the rear wall 31 of the box 24 being positioned to slidably engage the adjacent rear end of the post 21 to assist in holding the parts properly aligned.

The mass of the counterpoise 25 which desirably reciprocates with a minimum of friction in the sleeve 26 when the mower is in operation preferably bears a predetermined relation to the mass of the reciprocating sickle bar 6 and blades 8 such that the tendency of the drive of the sickle to produce vibration in the mower as a whole is counteracted by the out-of-phase reciprocation of the counterpoise whereby the mower can be operated at high speed without destructive vibration either of the mower itself or of the tractor-mower combination as a whole; the life of the mowever attachment as well as that of the tractor with which it is used are thus substantially prolonged and its useful life materially enhanced.

Brief reference has been made to the arm 11 which serves to connect the mower with the tractor, as well as to the shoes 10 which support the former from the ground and also control the height of the cut and some further description of these parts is now in order.

As indicated in the drawing, particularly in Figs. 1 and 4 the arm 11 extends angularly in two planes with respect to the sickle as a whole whereby the latter is supported from adjacent one end close to the ground and ahead of the tractor T, the angularity of arm 11 being such as to deflect the cut and falling crop from the vicinity of the wobble drive mechanism and thereby prevent the latter becoming fouled.

The shoes 10, the forwardly extending upturned toes 33 of which are pierced as at 33' to receive the pointed ends of corresponding guard fingers are provided at their heel ends with forwardly extending brackets 34 drilled to receive bolts 35 for securing them to the plate 4. In the drawing, particularly in Figs. 3 and 4 one of these shoes is illustrated as positioned for supporting the mower at substantially maximum height, a spacer 36 being disposed on each bolt 35 between the plate 4 and the bracket 34 of the shoe. This spacer may be omitted, however, or otherwise arranged with relation to the bracket and plate to afford a selection in the height above the ground at which the crop is cut and the length of the stubble remaining in the field after passage of the mower thereover.

While we have herein described with considerable particularity one embodiment of the invention, especially as it may be incorporated in a removable mower attachment for a garden tractor of a known type it will be understood we do not desire or intend to be thereby limited or confined in any way as its principles may be utilized as well in mowers and harvesters generally, either of the removable attachment type or those permanently connected with the supporting and driving vehicle, and changes and modifications in the form, structure and relationship of the several parts to each other and to the mechanism as a whole will readily occur to those skilled in the art and may be made if desired without departing from the spirit and scope of the invention as defined in the appended claims.

Having thus described our invention, we claim and desire to protect by letters Patent of the United States:

1. In a mower having a reciprocal cutting blade, a plate supporting the blade, an oscillatory drive shaft mounted proximate the plate and means including an arm projecting radially from the shaft operative to reciprocate the blade upon oscillation of the shaft, that improvement which comprises a guide carried by the plate, a bar slidable in the guide parallel to the blade, a second arm projecting radially from the shaft in diametrically opposed relation to the first arm, and a positive driving connection between the second arm and the bar whereby to reciprocate the latter in out-of-phase relation to the blade upon oscillation of the shaft.

2. In a mower having a reciprocal cutting blade, a plate supporting the blade, an oscillatory drive shaft mounted near one end of the plate and means including an arm projecting radially from the shaft operative to reciprocate the blade upon oscillation of the shaft, that improvement which comprises a guide carried by the plate proximate that edge thereof remote from the cutting edge of the blade, a bar slidable in the guide parallel to the blade and having a box-like socket at its end adjacent the shaft, a second arm projecting radially from the shaft in diametrically opposed relation to the first arm, and a roll carried by the second arm seating in the socket and forming therewith a positive driving connection between the second arm and the bar whereby to reciprocate the latter in out-of-phase relation to the blade upon oscillation of the shaft.

EDWIN K. BONNER, Jr.
JOSEPH JOHN VOZZI.

References Cited in the file of this patent
UNITED STATES PATENTS

| Number | Name | Date |
| --- | --- | --- |
| 1,091,105 | Young | Mar. 24, 1914 |
| 1,170,505 | Bishop | Feb. 8, 1916 |
| 1,647,867 | Hutsell | Nov. 1, 1927 |
| 1,901,293 | Gravely | Mar. 14, 1933 |
| 2,258,517 | Rose | Oct. 7, 1941 |
| 2,263,886 | Munro | Nov. 25, 1941 |
| 2,297,317 | Paradise et al. | Sept. 29, 1942 |
| 2,345,383 | Curtis | Mar. 28, 1944 |
| 2,468,312 | Turner | Apr. 26, 1949 |
| 2,501,631 | Oschwald | Mar. 21, 1950 |